(12) United States Patent
Gritti

(10) Patent No.: US 10,051,698 B2
(45) Date of Patent: Aug. 14, 2018

(54) CONTROL METHOD AND DEVICE EMPLOYING PRIMARY SIDE REGULATION IN A QUASI-RESONANT AC/DC FLYBACK CONVERTER WITHOUT ANALOG DIVIDER AND LINE-SENSING

(71) Applicant: STMicroelectronics S.r.l., Agrate Brianza (IT)

(72) Inventor: Giovanni Gritti, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/887,698

(22) Filed: Feb. 2, 2018

(65) Prior Publication Data

US 2018/0184493 A1 Jun. 28, 2018

Related U.S. Application Data

(63) Continuation of application No. 15/199,299, filed on Jun. 30, 2016, now Pat. No. 9,913,329.

(51) Int. Cl.
*H02M 3/335* (2006.01)
*H05B 33/08* (2006.01)
(Continued)

(52) U.S. Cl.
CPC .......... *H05B 33/0815* (2013.01); *H02M 1/08* (2013.01); *H02M 1/36* (2013.01);
(Continued)

(58) Field of Classification Search
CPC ........ H02M 1/08; H02M 1/36; H02M 1/4258; H02M 3/33507; H02M 2001/0009;
(Continued)

(56) References Cited

U.S. PATENT DOCUMENTS 5,502,370 A 3/1996 Hall et al.
5,729,443 A 5/1998 Pavlin
(Continued)

FOREIGN PATENT DOCUMENTS

CN 101527520 A 9/2009
CN 102255490 A 11/2011
(Continued)

OTHER PUBLICATIONS

Adragna, "Design Equations of High-Power-Factor Flyback Converters Based on the L6561," STMicroelectronics, AN1059—Application Note, Sep. 2003, 20 pages.
(Continued)

*Primary Examiner* — Alexander H Taningco
*Assistant Examiner* — Kurtis R Bahr
(74) *Attorney, Agent, or Firm* — Seed IP Law Group LLP

(57) ABSTRACT

A method controls a power switch and senses a primary current through a transformer primary winding coupled to the power switch and deactivates the switch responsive to the sensed primary current reaching a current sensed reference. A demagnetization mode is initiated responsive to deactivating the power switch. During this mode a first capacitance is charged with a first charging current to generate the current sensed reference. The first charging current is based on a bias signal. A second capacitance is charged with a second charging current to generate the bias signal. The second charging current is based on a compensation signal. A third charging current generates a comparison signal, the third charging current based on the current sensed reference. The compensation signal is based on a difference between the comparison signal and an internal reference and the power switch activated based on a secondary current in a secondary transformer winding.

20 Claims, 10 Drawing Sheets

(51) Int. Cl.
  *H02M 1/36* (2007.01)
  *H02M 1/42* (2007.01)
  *H02M 1/08* (2006.01)
  *H02M 1/00* (2006.01)

(52) U.S. Cl.
  CPC ..... *H02M 1/4258* (2013.01); *H02M 3/33507* (2013.01); *H02M 2001/0009* (2013.01); *H02M 2001/0022* (2013.01); *H02M 2001/0025* (2013.01)

(58) Field of Classification Search
  CPC .. H02M 2001/0022; H02M 2001/0025; H05B 33/0815
  See application file for complete search history.

(56) References Cited

U.S. PATENT DOCUMENTS

| | | |
|---|---|---|
| 6,181,120 B1 | 1/2001 | Hawkes et al. |
| 6,300,723 B1 | 10/2001 | Wang et al. |
| 6,356,466 B1 | 3/2002 | Smidt et al. |
| 6,853,563 B1 | 2/2005 | Yang et al. |
| 6,944,034 B1* | 9/2005 | Shteynberg ......... H02M 1/4258 323/282 |
| 7,425,857 B2 | 9/2008 | Confalonieri et al. |
| 7,928,701 B2 | 4/2011 | Usui |
| 8,467,209 B2 | 6/2013 | Adragna |
| 8,513,926 B2* | 8/2013 | Park .................... G05F 1/70 323/207 |
| 8,520,416 B2 | 8/2013 | Xie et al. |
| 8,525,495 B2 | 9/2013 | Werle et al. |
| 8,686,668 B2 | 4/2014 | Grotkowski et al. |
| 8,917,527 B2* | 12/2014 | Fang ................ H02M 3/33507 363/21.12 |
| 9,077,253 B2 | 7/2015 | Adragna |
| 9,190,835 B2* | 11/2015 | Chen .................... H02H 7/1252 |
| 9,326,336 B2 | 4/2016 | Knoedgen et al. |
| 9,455,636 B2* | 9/2016 | Gritti ................ H02M 3/33507 |
| 9,520,796 B2 | 12/2016 | Adragna et al. |
| 9,577,537 B2 | 2/2017 | Zhang et al. |
| 9,614,445 B2 | 4/2017 | Zhu et al. |
| 9,621,029 B2 | 4/2017 | Gritti |
| 9,800,148 B2 | 10/2017 | Gritti et al. |
| 9,800,164 B1 | 10/2017 | Li et al. |
| 9,866,124 B2 | 1/2018 | Stamm |
| 9,913,329 B2 | 3/2018 | Gritti |
| 2004/0095101 A1* | 5/2004 | Pidutti ................ H02M 1/4225 323/222 |
| 2012/0026765 A1 | 2/2012 | Adragna |
| 2012/0281438 A1 | 11/2012 | Fang et al. |
| 2013/0070485 A1 | 3/2013 | Li et al. |
| 2013/0114308 A1 | 5/2013 | Liao et al. |
| 2013/0154487 A1 | 6/2013 | Kuang et al. |
| 2013/0162297 A1 | 6/2013 | Gravati et al. |
| 2015/0055378 A1 | 2/2015 | Lin et al. |
| 2016/0103158 A1 | 4/2016 | Gravati et al. |
| 2016/0172981 A1 | 6/2016 | Gritti et al. |
| 2016/0248323 A1 | 8/2016 | Gritti et al. |
| 2016/0261199 A1 | 9/2016 | Adragna et al. |
| 2016/0276936 A1 | 9/2016 | Gritti |
| 2017/0117814 A1 | 4/2017 | Adragna et al. |
| 2018/0048239 A1 | 2/2018 | Adragna et al. |

FOREIGN PATENT DOCUMENTS

| | | |
|---|---|---|
| CN | 104038045 A | 9/2014 |
| EP | 2 753 148 B1 | 9/2015 |

OTHER PUBLICATIONS

Adragna, "Primary-Controlled High-PF Flyback Converters Deliver Constant Dc Output Current," Proceedings of the 2011—14th European Conference on Power Electronics and Applications (EPE 2011), Birmingham, Aug. 30-Sep. 1, 2011, 10 pages.

Adragna et al., "Flyback Converters with the L6561 PFC Controller," AN1060 (Application Note), STMicroelectronics, pp. 1-11, Jan. 2003.

Erickson et al., "Design of a Simple High-Power-Factor Rectifier Based on the Flyback Converter," Fifth Annual Applied Power Electronics Conference and Exposition (APEC '90), Conference Proceedings, Los Angeles, CA, Mar. 11-16, 1990, pp. 792-801.

Wang et al., "An Improved Control Strategy Based on Multiplier for CRM Flyback PFC to Reduce Line Current Peak Distortion," IEEE Energy Conversion Congress and Exposition (ECCE), Sep. 12-16, 2010, pp. 901-905.

Yan et al., "Variable-On-Time-Controlled Critical-Conduction-Mode Flyback PFC Converter," *IEEE Transactions on Industrial Electronics* 61(11):6091-6099, Nov. 2014.

Zhang et al., "An Optimal Peak Current Mode Control Scheme for Critical Conduction Mode (CRM) Buck PFC Converter," 10th China International Forum on Solid State Lighting (ChinaSSL), Nov. 10-12, 2013, pp. 182-189.

Electric Lamp & Component Manufacturers' Association of India, "Lighting Industry in India Performance Year 2012," retrived from www.globallightingassociation.org/documents/gla_papers/ELCOMA_presentation_to_GLA_April_24_2013.pdf on Apr. 30, 2018, 27 pages.

EU Science Hub, "Energy Efficiency," dated Nov. 14, 2016, retrieved from https://ec.europa.eu/jrc/en/energy-efficiency on Apr. 30, 2018, 2 pages.

Government of India Ministry of Railways, "Functional Requirement Specification for Energy Efficient LED Based Luminaire Unit for Indoor Lights to be Used in Indian Railway Offices and Buildings," retrieved from www.rdso.indianrailways.gov.in/uploads/File/110426-FRS_LED_Indoor_lighting_specifications_EOI(1).pdf on Apr. 30, 2018, 10 pages.

The Climate Group, "India Announces Critical Standards on LED Lighting," retrieved from https://www.theclimategroup.org/what-we-do/news-and-blogs/India-announces-critical-standards-on-LED-lighting on Apr. 30, 2018, 4 pages.

U.S. Department of Energy, Appliance and Equipment Standards Rulemakings and Notices, "External Power Supplies," retrieved from https://www1.eere.energy.gov/buildings/appliance_standards/standards.aspx?productid=1 on Apr. 30, 2018, 6 pages.

* cited by examiner

CONTROL METHOD AND DEVICE EMPLOYING PRIMARY SIDE REGULATION IN A QUASI-RESONANT AC/DC FLYBACK CONVERTER WITHOUT ANALOG DIVIDER AND LINE-SENSING

BACKGROUND

Technical Field

The present disclosure relates generally to converters and, more particularly, to control devices and methods for quasi-resonant AC/DC flyback converters.

Description of the Related Art

Converters, and particularly offline drivers of light emitting diode (LED) based lamps for bulb replacement, are often desired to have a power factor greater than 0.9, low total harmonic distortion (THD) and safety isolation. At the same time, for cost reasons, it is desirable to regulate the output DC current generated by such a converter as required for proper LED driving without utilizing a closed feedback loop between a primary side and a secondary side of the converter. In this way, a current sensing element, a voltage reference and an error amplifier on the secondary side, as well as an opto-isolator or optocoupler to transfer the generated error signal from the secondary side to a control circuit on the primary side, are no longer required. This is referred to as opto-less regulation. In addition to opto-less regulation, recently considerable emphasis has been given to the total harmonic distortion (THD) of the ac input current caused by such a converter, and in some geographical areas achieving THD<10% is becoming a market requirement.

High-power-factor (high-PF) flyback converters are able to meet power factor and isolation specifications with a simple and inexpensive power stage. In a high-PF flyback converter, like in any high-PF converter topology, there is no energy reservoir capacitor after an input rectifier bridge that receives an AC mains input voltage. Thus, the voltage output from the rectifier bridge, which is the input voltage to the power stage of the converter, is a rectified sinusoid. To achieve a high-PF and low-THD, the input current to the rectifier bridge must be sinusoidal-like and must track the AC mains input voltage supplied to the rectifier bridge, thus originating a time-dependent input-to-output power flow. As a result, the output current from the rectifier bridge contains a large AC component at twice the frequency of the AC mains input voltage.

A quasi-resonant (QR) flyback converter has a power switch turn-on that is synchronized to the instant a transformer of the converter demagnetizes (i.e. the secondary current has become zero), normally after an appropriate delay. This allows the turn-on to occur in the valley of the drain voltage ringing that follows the demagnetization, which is often termed "valley-switching." Typically, peak current mode control is used, so the turn-off of the power switch is determined by a current sense signal reaching the value programmed into a control loop that regulates the output voltage or current from the converter.

In markets such as the LED lighting market, the current trend is to provide compact and low cost solutions for converters for driving LEDs, while at the same time maintaining high performance in terms of LED current regulation, power factor PF, distortion THD and efficiency. For example, converters may be contained in products that need to meet specific performance criteria such as those set forth in Energy STAR specifications. In the LED lighting market, these converters are typically QR flyback converters that include analog divider circuitry that is usually a non-negligible portion in terms of silicon area of an integrated circuit containing the converter circuitry. This increases the cost and complexity of such a QR flyback converter. In addition, such a QR flyback converter typically includes line-sensing circuitry to sense the instantaneous rectified AC mains input voltage supplied to the converter. The power loss in such line-sensing circuitry may be, for example, 10 mW-15 mW. Some of the latest market requirements, such as EU COC Ver.5 and US DOE Feb.2014, specify total power consumption for the entire converter to be lower than 75 mW-100 mW in a no-load condition. As a result, the power loss in the line-sensing circuitry may no longer be considered insignificant or negligible. There is a need for improved QR flyback converter circuits and methods to satisfy current market requirements.

BRIEF SUMMARY

One embodiment of the present disclosure is a quasi-resonant (QR) flyback converter having a sinusoidal input current in order to achieve low total harmonic distortion THD and high power factor (Hi-PF) and implanting control using only quantities available on the primary side of the converter.

According to one embodiment of the present disclosure, a primary-side controlled high power factor, low total harmonic distortion, quasi resonant flyback converter converts an AC mains power line input to a DC output for powering a load, such as a string of LEDs. The AC mains power line input is supplied to a transformer that is controlled by a power switch.

In one embodiment, a device for controlling a power transistor of a power stage includes a shaper circuit including a first current generator configured to output a first current responsive to a bias voltage signal and to generate a reference voltage signal based on the first current. A bias circuit includes a second current generator configured to output a second current responsive to a compensation voltage signal and to generate the bias voltage based on the second current. An error detection circuit includes a third current generator configured to output a third current responsive to the reference voltage signal and to generate the compensation voltage signal based on the third current. A driver circuit has a first input configured to receive the reference voltage signal and having an output configured to drive the power transistor.

DETAILED DESCRIPTION

Figure 1:
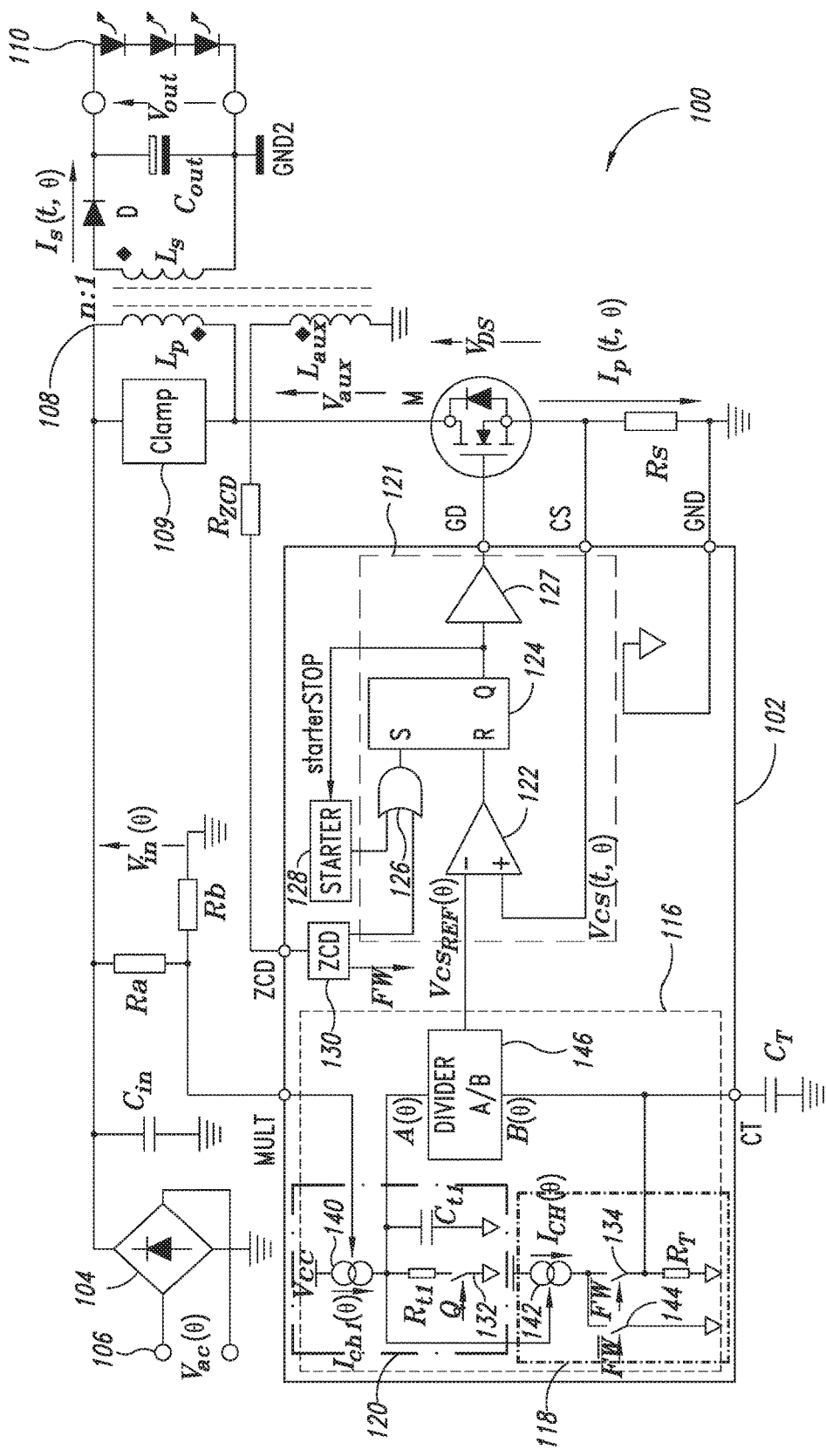
FIG. 1 is a schematic of a primary-controlled Hi-PF QR Flyback converter implementing a prior art primary-side control method.

FIG. 1 is a schematic of a conventional hi-PF QR flyback converter 100 that will now be described to provide a better understanding of such a converter before discussing hi-PF QR flyback converters according to embodiments of the present disclosure. On the primary side, the QR flyback converter 100 includes a controller 102, a bridge rectifier 104 having inputs 106 coupled to an AC mains power line that supplies an AC mains input voltage $V_{ac}(\theta)$, an input capacitor $C_{in}$, a voltage divider $R_a$–$R_b$ coupled to the bridge rectifier 104, a primary winding $L_p$ and an auxiliary winding $L_{aux}$ of a transformer 108, a power switch M coupled to the transformer 108 and controlled by controller 102, a sensing resistor $R_s$ coupled in series with the power switch M to provide a sensed voltage to the controller indicating a current flowing through the power, a zero-crossing detection resistor $R_{ZCD}$ coupled to the auxiliary winding $L_{aux}$, and a clamp circuit 109 connected across the primary winding $L_p$ to clamp a leakage inductance of the primary winding.

On the secondary side of the converter 100, secondary winding $L_s$ of the transformer 108 has one end connected to a secondary ground GND2 and the other end connected to the anode of a diode D having the cathode connected to the positive plate of a capacitor $C_{out}$ that has its negative plate connected to the secondary ground. The converter 100 provides an output voltage $V_{out}$ that supplies power to a load 110, which in FIG. 1 is a set of series-connected LEDs, although other loads could be supplied with electrical power by the converter 100.

The controller 102 has a reference voltage estimation circuit 116 that is configured to produce a reference voltage $Vcs_{REF}(\theta)$ and includes a bias circuit 118 and a shaper circuit 120. The controller 102 also includes a driver circuit 121 having a PWM comparator 122, a set-reset (SR) flip-flop 124, an OR gate 126, and driver 127 configured to drive the power switch M. The PWM comparator 122 includes an inverting input that receives the reference voltage $V_{CSREF}(\theta)$, a non-inverting input that receives a sense voltage $V_{CS}$ from the sense resistor $R_s$, and an output that provide a reset signal to a reset input R of the flip-flop 124. The flip-flop 124 also includes a set input S coupled to an output of the OR gate 126, and an output that is coupled to an input of the driver 127. The OR gate 126 also has first and second inputs coupled to respective outputs of a starter block 128 and a zero current detection (ZCD) block 130. The OR gate 126 provides a set signal to the set input S of the SR flip flop when the ZCD block 130 detects that a falling edge of an auxiliary voltage $V_{aux}$ as applied through a resistor $R_{ZCD}$ goes below a threshold, or when the starter block 128 produces a start signal to initiate a switching cycle. The transformer 108 includes an auxiliary coil as shown in FIG. 1 which generates the auxiliary voltage $V_{aux}$. The starter block 128 outputs a signal at power-on when no signal is available on the input of the ZCD block 130 and prevents the converter 100 from getting "stuck" in the event the signal on the input of the ZCD block 130 is lost for any reason. The ZCD block 130 also generates a freewheeling signal FW that is high during demagnetization of the transformer 108, as shown in FIG. 2A, and is used by the reference voltage estimation circuit 116 to generate a B(θ) signal, as will be described in more detail below.

Figure 2A:
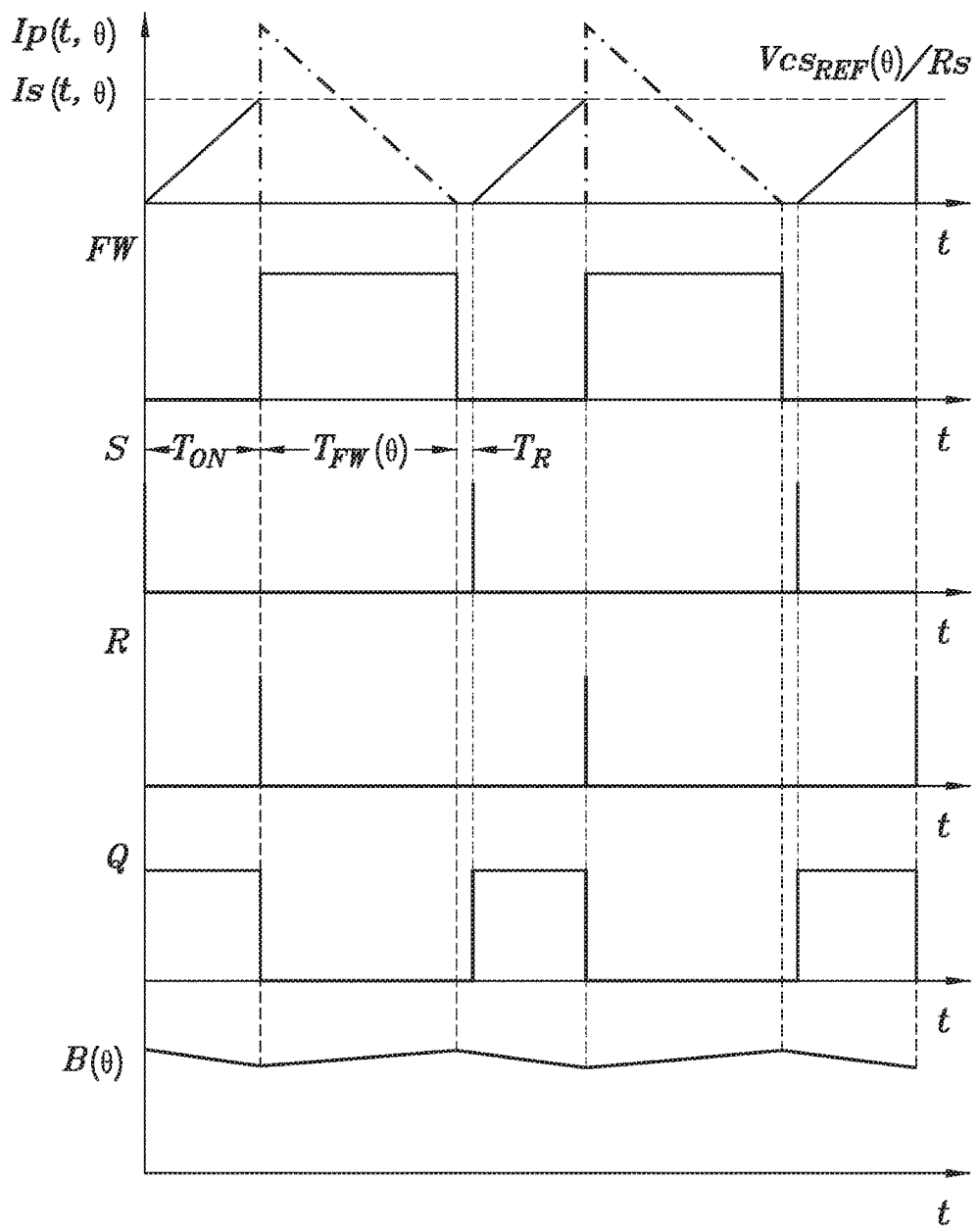
FIGS. 2A and 2B are timing diagrams illustrating key waveforms in the flyback converter of FIG. 1 during operation of the converter.
Figure 2B:
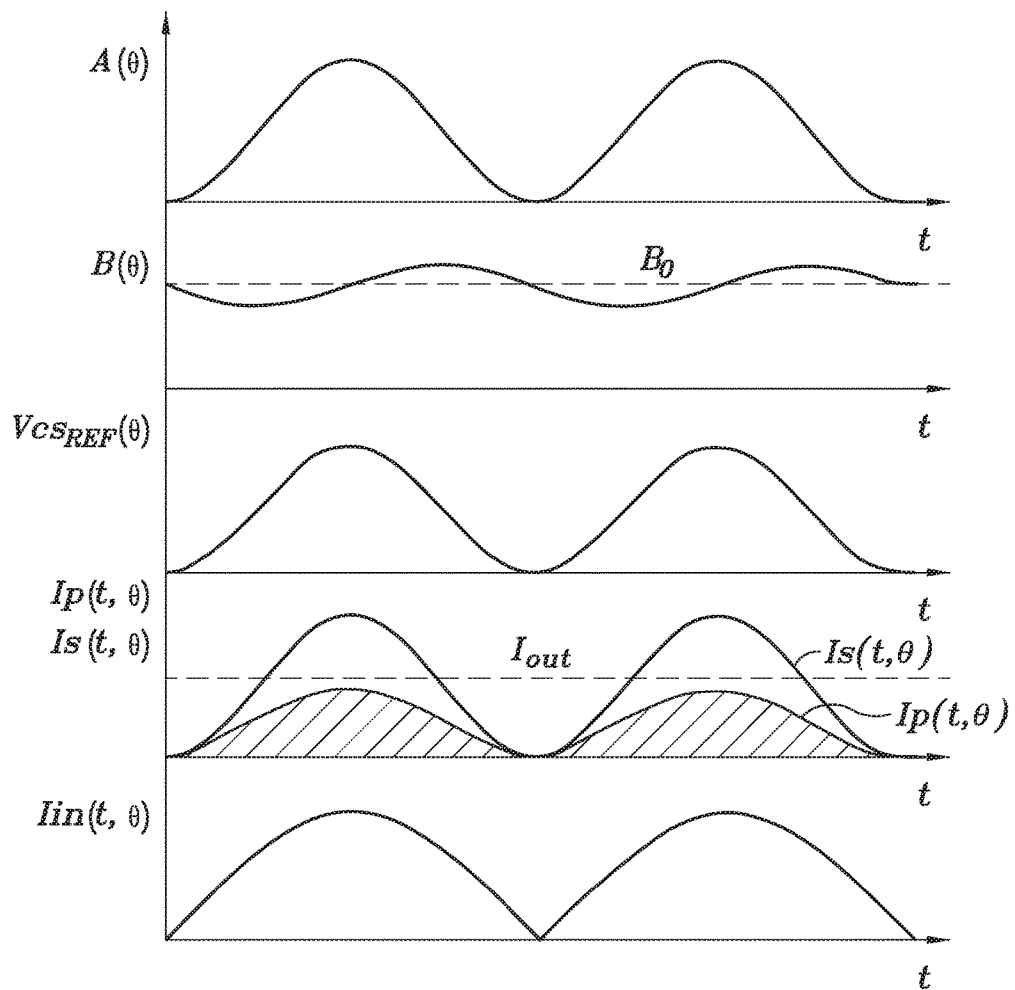

FIGS. 2A and 2B are timing diagrams illustrating key waveforms in the flyback converter 100 of FIG. 1 during operation, with the waveforms in FIG. 2A being on a switching period time scale and the waveforms in FIG. 2B being on an AC mains power line cycle time scale. The freewheeling signal FW is high during demagnetization (i.e., energy stored in the primary winding $L_p$ is transferred to the secondary winding $L_s$) of the transformer 108 and is low otherwise. Thus, as seen in FIG. 2A, the FW signal is low during a delay time $T_R$ during which a secondary current $I_s(t,\theta)$ through the secondary winding Ls has gone to zero. This delay time $T_R$ in the quasi-resonant (QR) flyback converter 100 is the delay between the instant the transformer 108 demagnetizes (i.e. a secondary current $I_s(t,\theta)$ equals zero) and the turning ON of the power switch M. The FW signal stays low during the magnetic energy storage phase when the power switch M is turned ON and a primary current $I_p(t,\theta)$ flows through the primary winding $L_p$ to thereby store magnetic energy in the primary winding.

The shaper circuit 120 has a first current generator 140, a resistor $R_{t1}$ coupled to an output of the first current generator 140, a switch 132 that switchably couples the resistor $R_{t1}$ to ground, and a capacitor $C_{t1}$ coupled between the output of the current generator 140 and ground. The first current generator 140 has an input coupled to a supply voltage terminal Vcc and a control terminal coupled to the voltage divider $R_a$–$R_b$ via a pin MULT. The first current generator 140 produces a current $I_{CH1}(\theta)$ based on a value of the voltage generated by the voltage divider $R_a$–$R_b$ and present on the MULT pin. The switch 132 is controlled by the output Q of the flip-flop 124 and thereby connects the capacitor $C_{t1}$ in parallel with the switched resistor $R_{t1}$ when the power switch M is ON.

The bias circuit 118 includes a second current generator 142 having an input coupled to the supply terminal Vcc, a control terminal coupled to the output of the first current generator 140, and an output at which the second current generator produces a current $I_{CH}(\theta)$. A second switched resistor $R_t$ is switchably coupled to the output of the second current generator 142 by a switch 134 configured to connect the resistor $R_t$ to the second current generator 142 under the control of the signal FW provided by the ZCD block 130. The signal FW is high when the current is flowing in the secondary winding $L_s$. Another switch 144 is coupled to the output of the second current generator 142 and is configured to connect the output of the second current generator 142 to ground when the ZCD block 130 drives a signal $\overline{FW}$, which is the complement or inverted version of the signal FW, high, indicating no current is flowing in the secondary winding $L_s$ as seen in FIG. 2A.

The reference voltage estimation circuit 116 also includes a divider block 146 having a first input that receives a signal A(θ) from the shaper circuit 120, a second input that receives the signal B(θ) from the bias circuit 118, and an output at which the divider provides the reference voltage $Vcs_{REF}(\theta)$. The signal A(θ) is generated by the first current generator 140 acting on the switched resistor Rt1 and capacitor Ct1. The current Ich1(θ) produced by the current generator 140 is proportional to a rectified input voltage Vin(θ) produced at the voltage divider Ra-Rb and supplied to the current generator 140 through the MULT pin. The divider ratio Rb/(Ra+Rb) of the voltage divider Ra-Rb will be denoted as Kp herein. The resistor Rt1 is connected in parallel to the capacitor Ct1 by the switch 132 when the signal Q of the SR flip flop 124 is high, i.e. during the on-time of the power switch M, and is disconnected when the signal Q is low, i.e. during the off-time of the power switch M. The voltage developed across the capacitor $C_{t1}$ is A(θ) and is fed to the first input of the divider block 146. The current generator 140, capacitor $C_{t1}$, resistor $R_{t1}$ and switch 132 collectively form the shaper circuit 120, which is termed a "shaper" circuit because the circuit changes the shape of the current programming signal.

In the flyback converter 100 of FIG. 1, a capacitor $C_T$ is coupled to a pin CT of the controller 102 and is assumed to be large enough so that the AC component (at twice the AC mains input line frequency $f_L$) of the B(θ) signal is negligible, at least to a first approximation, with respect to the DC component B0 of the B(θ) signal. As a result, the divider block 146 provides the reference voltage $Vcs_{REF}(θ)$ that is the division of the A(θ) signal generated by the shaper circuit 120 by the B(θ) signal generated by the bias circuit 118.

The inverting input of the PWM comparator 122 receives the reference voltage $Vcs_{REF}(θ)$ the non-inverting input receives the voltage Vcs(t, θ), which is the voltage sensed across the sense resistor Rs that is a voltage proportional to the instantaneous current Ip(t, θ) flowing through the primary winding Lp and the power switch M when the power switch is turned ON. Assuming the power switch M is initially turned ON, the current through the primary winding Lp will be ramping up and so will the voltage across the resistor Rs. When the voltage Vcs(t,θ) across the sense resistor Rs equals the reference voltage $Vcs_{REF}(θ)$, the PWM comparator 122 drives its output to reset the PWM latch or SR flip-flop 124, causing the SR flip-flop to drive its output Q low to thereby turn OFF the power switch M. Therefore, the reference voltage $Vcs_{REF}(θ)$ provided by the divider block 146 determines the peak value of the primary current Ip(t, θ) that, as a result, will be enveloped as the A(θ) signal.

After the power switch M is switched OFF, the energy stored in the primary winding Lp is transferred by magnetic coupling to the secondary winding Ls and then transferred to the output capacitor Cout and the load 110 until the secondary winding Ls is completely demagnetized. At this point, the diode D opens (i.e., turns OFF) and the drain node of the power switch M, which while the secondary winding Ls and the diode D were conducting was fixed at a voltage Vin(θ)+ VR, is in a floating or high impedance state. The voltage VR is the reflected voltage, which is the output voltage Vout across the secondary winding Ls times the primary-to-secondary turns ratio n=Np/Ns of the transformer 108. The reflected voltage VR would tend to eventually reach the instantaneous input voltage Vin(θ) through a damped ringing due to a parasitic capacitance that starts resonating with the primary winding Lp. The quick fall of the drain voltage of the power switch M that follows demagnetization of the transformer 108 is coupled through the auxiliary winding Laux and the resistor $R_{ZCD}$ to the pin ZCD of the controller 102. The ZCD block 130 is coupled to the ZCD pin and generates a pulse every time the ZCD block detects a negative-going edge falling below a threshold, and this pulse is applied through the OR gate 126 to set the PWM latch 124 and thereby turn ON the power switch M, starting a new switching cycle of the flyback converter 100. The OR gate 126 allows the output of the "STARTER" block to also initiate a switching cycle by applying a signal through the OR gate to set the PWM latch 124. As previously described, this serves at power-on when no signal is available on the ZCD pin input and prevents the converter 100 from getting stuck in case the signal on the ZCD input is lost for any reason.

As shown in FIG. 2A the OFF-time of the power switch M is the sum of the time $T_{FW}(θ)$ during which the primary winding Lp is discharged and a time $T_R$ during which the secondary winding Ls current has gone to zero. As a result, the switching period T(θ) of the flyback converter 100 is therefore given by:

$$T(θ)=T_{ON}(θ)+T_{FW}(θ)+T_R \qquad \text{(Eqn. 1)}$$

where θ can be considered ϵ(θ, π).

A fundamental assumption for the following analysis is that $T(θ) \ll (R_{t1} \times C_{t1}) \ll 1/f_L$. In this way, on the one hand the switching frequency ripple across capacitor $C_{t1}$ is negligible while on the other hand the current $I_{ch1}(θ)$ can be considered constant within each switching cycle. This being assumed, it is possible to find the A(θ) signal or voltage developed across capacitor $C_{t1}$ by charge balance according to:

$$I_{ch1}(θ)T(θ) = \frac{A(θ)}{R_{t1}} T_{ON}(θ) \qquad \text{(Eqn. 2)}$$

The current $I_{ch1}(θ)$ is provided by the current generator 140 and it can be expressed as:

$$I_{ch1}(θ)=g_{m1}K_p(V_{PK} \sin θ) \qquad \text{(Eqn. 3)}$$

where $g_{m1}$ is the current-to-voltage gain of the current generator 140 that generates the current $I_{ch1}(θ)$.

Solving for A(θ) voltage and considering Eqn. 3:

$$A(θ) = R_{t1}I_{ch1}(θ)\frac{T(θ)}{T_{ON}(θ)} = R_{t1}g_{m1}K_p(V_{PK}\sin θ)\frac{T(θ)}{T_{ON}(θ)} \qquad \text{(Eqn. 4)}$$

The current $I_{CH}(θ)$ provided by the current generator 140 that is used to generate the B(θ) signal can be expressed as:

$$I_{CH}(θ)=G_M A(θ) \qquad \text{(Eqn. 5)}$$

where $G_M$ is the current-to-voltage gain of the current generator 142 that generates the current $I_{CH}(θ)$.

Now considering the capacitor $C_T$ by charge balance, it is possible to find the voltage B(θ) developed across the capacitor $C_T$ as follows:

$$I_{CH}(θ)T_{FW}(θ) = \frac{B(θ)}{R_T}T(θ) \qquad \text{(Eqn. 6)}$$

Solving the previous expression for B(θ) and considering Eqns. (4) and (5):

$$B(θ) = G_M R_T g_{m1} R_{t1} K_p(V_{PK}\sin θ)\frac{T_{FW}(θ)}{T_{ON}(θ)} \qquad \text{(Eqn. 7)}$$

The capacitor $C_T$ is assumed to be large enough so that the AC component (at twice the AC mains input line frequency $f_L$) of the voltage B(θ) is negligible with respect to its DC component $B_0$, which is defined as:

$$B_0 = \overline{B(\theta)} = \frac{1}{\pi} G_M R_T g_{m1} R_{t1} K_p \int_0^\pi (V_{PK} \sin\theta) \frac{T_{FW}(\theta)}{T_{ON}(\theta)} d\theta \quad \text{(Eqn. 8)}$$

Considering the voltage-second balance for the Flyback converter's transformer, the primary on time $T_{ON}(\theta)$ and secondary on time $T_{FW}(\theta)$ can be expressed by the following relationship:

$$V_{IN}(\theta)T_{ON}(\theta) = n(V_{OUT} + V_F)T_{FW}(\theta) \quad \text{(Eqn. 9)}$$

where $V_F$ is the forward drop on the diode D.

Solving Eqn. 9 and considering that $Kv = V_{PK} VR$, where $V_R = n(V_{OUT} + V_F)$, the ratio between $T_{FW}(\theta)$ and $T_{ON}(\theta)$ times results in the following:

$$\frac{T_{FW}(\theta)}{T_{ON}(\theta)} = K_v \sin\theta \quad \text{(Eqn. 10)}$$

Combining Eqns. (8) and (10) the DC component of the signal B(θ) results as follows:

$$B_0 = \frac{G_M R_T g_{m1} K_p V_{PK} K_v}{2} \quad \text{(Eqn. 11)}$$

Combining Eqns. (11) and (4) the expression for the voltage reference $Vcs_{REF}(\theta)$ results as follows:

$$Vcs_{REF}(\theta) = K_D \frac{A(\theta)}{B(\theta)} \approx K_D \frac{A(\theta)}{B_0} = K_D \frac{2}{G_M R_T K_v} \sin\theta \frac{T(\theta)}{T_{ON}(\theta)} \quad \text{(Eqn. 12)}$$

where $K_D$ is the voltage divider gain and it is dimensionally a voltage.

Considering that the peak primary current $I_{pkp}(\theta)$ can be expressed as:

$$I_{pkp}(\theta) = \frac{Vcs_{REF}(\theta)}{R_S} \quad \text{(Eqn. 13)}$$

then the peak secondary current $I_{pks}(\theta)$ can be calculated by combing Eqns. (13) and (12) and considering that the secondary current is n=Np/Ns times the primary current:

$$I_{pks}(\theta) = nI_{pkp}(\theta) = nK_D \frac{2}{G_M R_T K_v} \sin\theta \frac{T(\theta)}{T_{ON}(\theta)} \frac{1}{R_S} \quad \text{(Eqn. 14)}$$

Since the cycle-by-cycle secondary current $I_s(t,\theta)$ is the series of triangles shown for this waveform in FIG. 2A, the average value of the secondary current $I_s(t,\theta)$ in a switching cycle is:

$$I_o(\theta) = \frac{1}{2} I_{pks}(\theta) \frac{T_{FW}(\theta)}{T(\theta)} = \frac{nK_D}{G_M R_T K_v} \sin\theta \frac{T_{FW}(\theta)}{T_{ON}(\theta)} \frac{1}{R_S} \quad \text{(Eqn. 15)}$$

The dc output current Tout is the average of Io(θ) over a line half-cycle:

$$I_{out} = \overline{I_o(\theta)} = \frac{1}{\pi} \int_0^\pi \frac{nK_D}{G_M R_T K_v R_S} \sin\theta \frac{T_{FW}(\theta)}{T_{ON}(\theta)} d\theta \quad \text{(Eqn. 16)}$$

Finally, combining Eqns. (16) and (10), the average output current $I_{out}$ from the converter 100 is given as:

$$I_{out} = \frac{nK_D}{2G_M R_T R_S} \quad \text{(Eqn. 17)}$$

Equation (17) states that the DC output current $I_{out}$ from the converter 100 depends only on external, user-selectable parameters (n, Rs) and on internally fixed parameters ($G_M$, $R_T$, $K_D$) and does not depend on the output voltage Vout, or on the root mean square (RMS) input voltage $V_{in}(\theta)$ or on the switching frequency $f_{SW}(\theta) = 1/T(\theta)$.

The input current $I_{in}(\theta)$ to the converter 100 is found by averaging the primary current $I_p(t,\theta)$, which is the series of triangles for the $I_p(t,\theta)$ current in FIG. 2A over a switching cycle of the converter. From Eqns. (12) and (13), the input current $I_{in}(\theta)$ is given by:

$$I_{in}(\theta) = \frac{1}{2} I_{pkp}(\theta) \frac{T_{ON}}{T(\theta)} = \frac{1}{R_S} \frac{K_D}{G_M R_T K_v} \sin\theta \quad \text{(Eqn. 18)}$$

Equation (18) shows that the input current $I_{in}(\theta)$ is a pure sinusoid in all operating conditions so the converter 100 has ideally a unity power factor and zero harmonic distortion of the input current (i.e., PF=1 and THD=0).

From the above description of the hi-PF QR flyback converter 100, it is seen that this converter is hi-PF and low THD converter and utilizes a control algorithm that is able to regulate the DC output current and voltage using primary-side control (i.e., using only operational quantities available on the primary side of the converter. This is opto-less control, as previously discussed. Thus, while this control scheme advantageously provides QR operation mode with opto-less primary-side control and a hi-PF and low THD, the control scheme utilizes the line-sensing circuitry formed by the voltage divider including resistors Ra and Rb, which has a relatively significant power consumption, and also utilizes the analog divider block 146, which occupies a relatively large portion or area of an integrated circuit in which the controller 102 is formed. The flyback converter 100 of FIG. 1 is described in detail in U.S. patent application Ser. No. 14/572,627, which is incorporated herein by reference in its entirety to the extent the disclosure of this application is not inconsistent with the disclosure of the present application.

As a result of these drawbacks of the flyback converter 100 as described above with reference to FIGS. 1 and 2, the present disclosure is directed to primary-side control techniques for a QR flyback converter that do not require such line-sensing circuitry and analog divider circuitry while still providing hi-PF and low THD operation, as will now be described in more detail.

Referring to Eqn. (16) above, the DC output current $I_{out}$ if a QR flyback converter can be expressed, by combining Eqns. (16), (15), (13) and (14), as follows:

$$I_{out} = \overline{I_o(\theta)} = \frac{n}{2\pi R_S} \int_0^\pi Vcs_{REF}(\theta) \frac{T_{FW}(\theta)}{T(\theta)} d\theta \quad \text{(Eqn. 19)}$$

Equation (19) shows that the DC output current $I_{out}$ can be regulated using only quantities available on the primary side of the flyback converter and without an analog divider block 146 (FIG. 1) if the quantity on the right-hand side of Eqn. (19) is constant, which means independent of the output voltage $V_{out}$, the RMS input voltage $V_{in}(\theta)$ and from the switching frequency $f_{SW}(\theta)=1/T(\theta)$). The second consideration is based on the transformer voltage-second balance as set forth in Eqn. (9) that can be expressed as:

$$\frac{T_{FW}(\theta)}{T_{ON}(\theta)} = \frac{V_{in}(\theta)}{n(V_{OUT} + V_F)} \qquad \text{(Eqn. 20)}$$

which shows that the shape of the input voltage $V_{in}(\theta)$ needed to achieve high-PF and low-THD can be estimated without using line-sensing circuitry by generating a voltage proportional to the ratio between the free-wheeling time $T_{FW}(\theta)$ and the ON-time $T_{ON}(\theta)$ of the power switch M, as will now be described in detail with reference to FIGS. 3-8.

Figure 3:
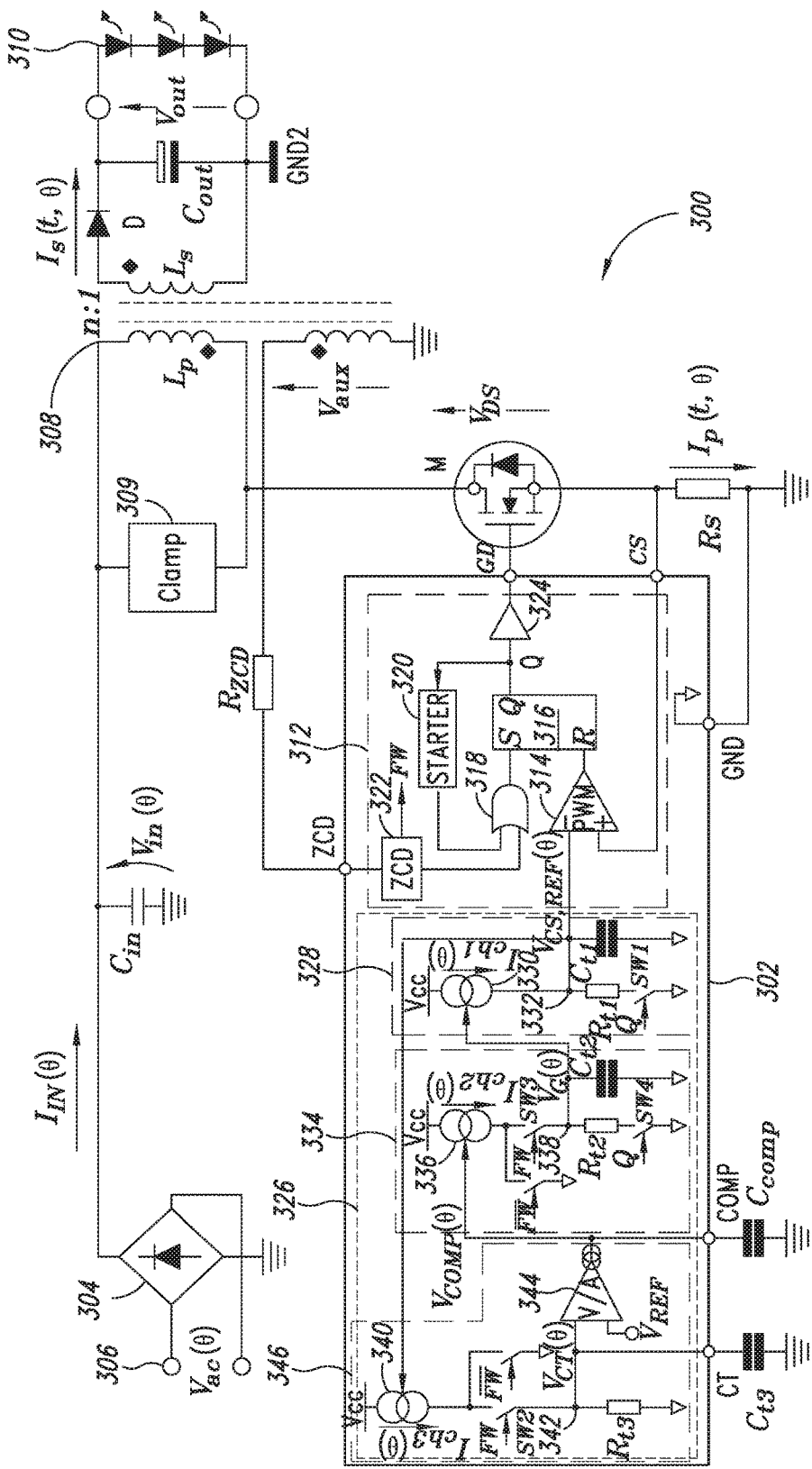
FIG. 3 is a schematic of a primary-controlled Hi-PF QR flyback converter according to one embodiment of the present disclosure.
Figure 4A:
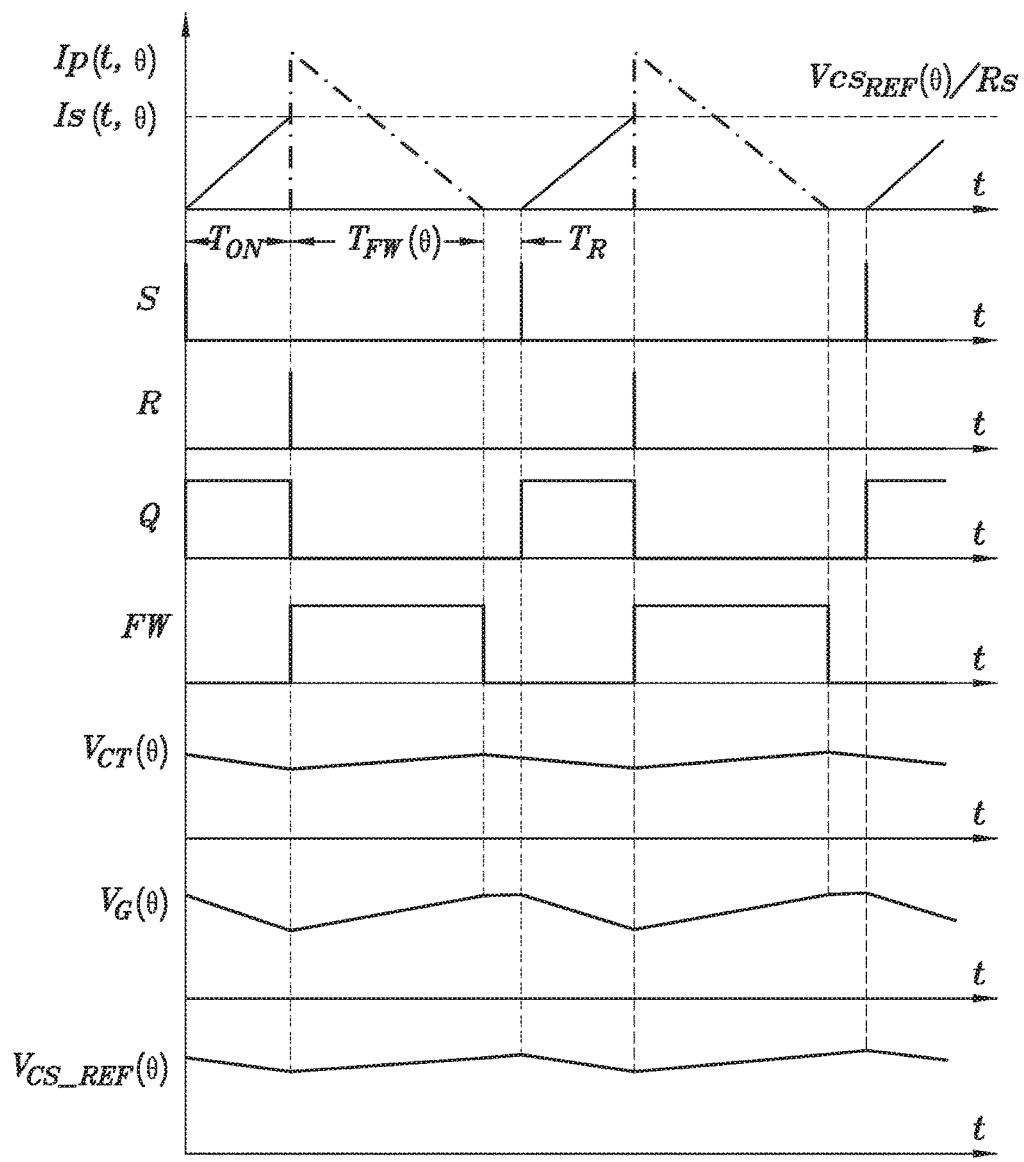
FIGS. 4A and 4B are timing diagrams illustrating key waveforms in the flyback converter of FIG. 3 during operation of the converter.
Figure 4B:
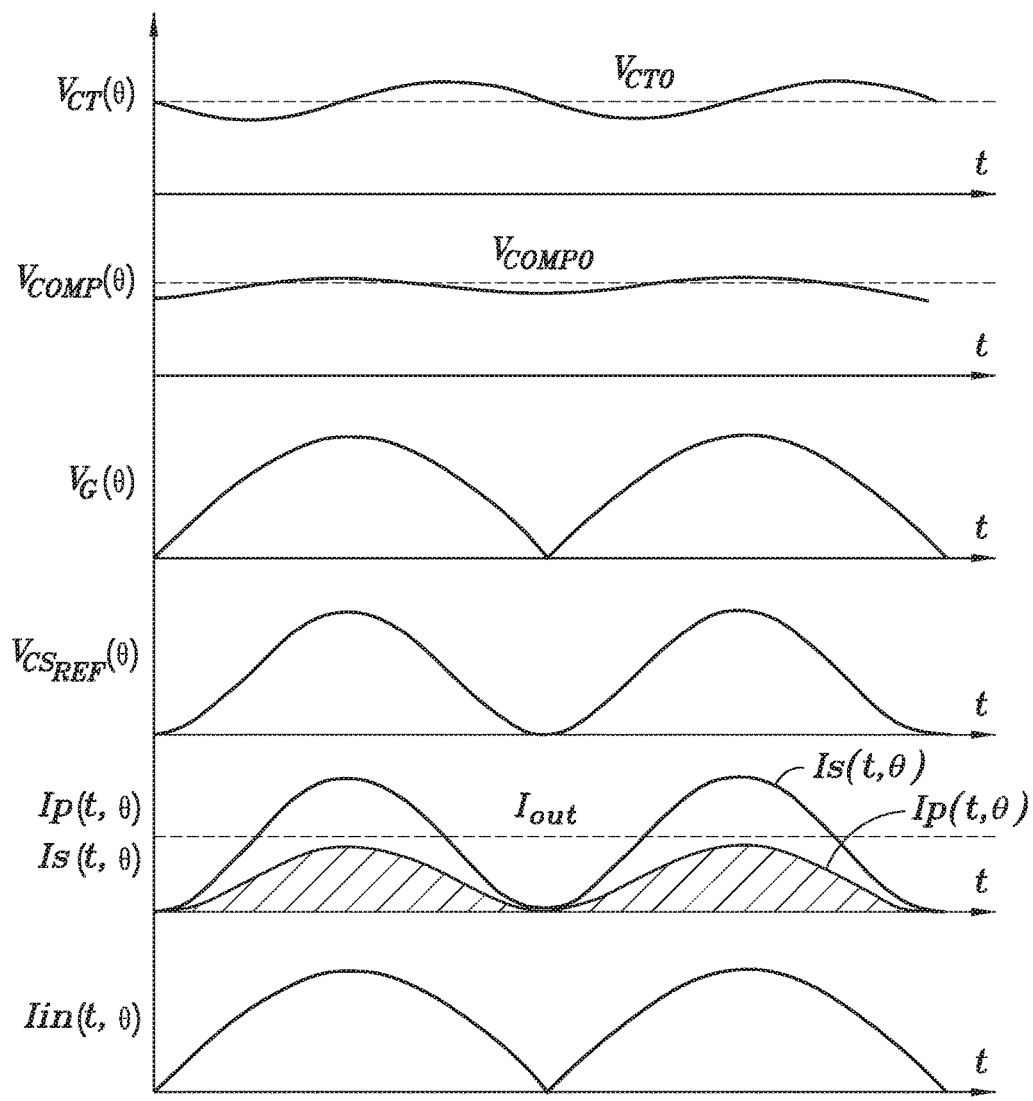

FIG. 3 is a schematic of a primary-controlled Hi-PF QR flyback converter 300 including a controller 302 for controlling the converter without line-sensing circuitry or an analog divider circuit according to one embodiment of the present disclosure. FIGS. 4A and 4B are timing diagrams illustrating key waveforms generated in the flyback converter 300 during operation and will be discussed in more detail below. In FIG. 4A the designated waveforms or signals are on a switching period time scale along the horizontal axis while in FIG. 4B the waveforms are on an AC mains line cycle time scale on the horizontal axis.

In the flyback converter 300 of FIG. 3, components 304-310 correspond to the components 104-110 previously described with reference to the converter 100 of FIG. 1. Thus, for the sake of brevity, the detailed operation of these components 304-310 will not again be discussed in detail with reference to the converter 300 of FIG. 3. Other components of the converter 300 are also the same as those in the converter 100 of FIG. 1, such as zero current detection resistor $R_{ZCD}$, input capacitor $C_{in}$, power switch M and sense resistor Rs, for example. The detailed individual operation of all such components will also not again be provided with reference to FIG. 3. Finally, the same is even true of some components of the controller 302, which executes a different control method to control the operation of the converter 300 than does the controller 102 of FIG. 1. For example, the controller 302 includes a driver circuit 312 including components 314-324 having the same structure and functionality as corresponding components in the driver circuit 121 of FIG. 1. The individual operation of these components 314-324 has thus effectively been described with reference to the driver circuit 121 of FIG. 1 and will not again be described in detail with reference to the driver circuit 312 of FIG. 3. In FIG. 3, all the components external to the controller 302 may be considered the power stage of the flyback converter 300.

While the driver circuit 312 of the controller 302 has the same structure and operation as the driver circuit 121 of the controller 102 of FIG. 1, the controller 302 further includes a reference voltage estimation circuit 326 having a different structure and different operation than the voltage reference circuit 116 in the controller 102 of FIG. 1, as will now be described in more detail. In operation, the reference voltage estimation circuit 326 generates a first reference voltage $Vcs_{REF}(\theta)$ that is supplied to the inverting input of the PWM comparator 314 of the driver circuit 312. The reference voltage estimation circuit 326 includes a shaper circuit 328 having the same structure as the shaper circuit 120 of FIG. 1. More specifically, the shaper circuit 328 includes a first current generator 330 that supplies a first current $I_{ch1}(\theta)$ to a node 332 on which the first reference voltage $Vcs_{REF}(\theta)$ is generated. This first current $I_{ch1}(\theta)$ has a value that is based on a voltage $V_G(\theta)$ generated by a bias circuit that will be described in more detail below. A resistor $R_{t1}$ is coupled in series with a switch SW1 between the node 332 and ground, with the switch being controlled by the output signal Q provided by the PWM latch 316. A capacitor $C_{t1}$ is also coupled between the node 332 and ground and is charged by the current $I_{ch1}(\theta)$ from the first current generator 330 to generate the reference voltage $Vcs_{REF}(\theta)$ on the node 332. When the output signal Q is activated or turned ON to thereby turn ON the power switch M, the Q signal also closes the switch SW1 to thereby discharge the capacitor $C_{t1}$ through the resistor $R_{t1}$ and reduce the reference voltage $Vcs_{REF}(\theta)$.

The reference voltage estimation circuit 326 further includes a bias circuit 334 that generates the voltage $V_G(\theta)$ that is supplied to the current generator 330 to set the value of the first current $I_{ch1}(\theta)$. The bias circuit 334 includes a second current generator 336 that generates a second current a current $I_{ch2}(\theta)$ that is supplied through one of a pair of complementary switches SW3 to a node 338. The second current $I_{ch2}(\theta)$ has a value that is based on a compensation signal $V_{COMP}(\theta)$ generated by other circuitry in the controller 302 that will be described in more detail below. A resistor $R_{t2}$ is coupled in series with a switch SW4 between the node 338 and ground, with the switch SW4 being controlled by the output signal Q from the PWM latch 316.

A capacitor $C_{t2}$ is also coupled between the node 338 and ground and is charged by the current $I_{ch2}(\theta)$ from the second current generator 336 when the FW signal generated by the ZCD block 322 closes the one of the complementary switches SW3 connected between the second current generator 336 and the node 338. In this situation, the current $I_{ch2}(\theta)$ from the second current generator 336 charges the capacitor $C_{t2}$ to generate the voltage $V_G(\theta)$ on the node 338. When the output signal Q is activated or turned ON to thereby turn ON the power switch M, the Q signal also closes the switch SW4 to thereby discharge the capacitor $C_{t2}$ through the resistor $R_{t2}$ and reduce the voltage $V_G(\theta)$. The other one of the complementary switches SW3 is coupled between the second current generator 336 and ground and is controlled by the $\overline{FW}$ signal, namely the inverted version or complement of the FW signal generated by the ZCD block 322). The FW signal goes high when no current is flowing in the secondary winding $L_s$, which is seen through the FW signal illustrated in FIG. 4A.

Finally, the controller 302 includes other circuitry that generates the compensation signal $V_{COMP}(\theta)$ as previously mentioned. This other circuitry includes a third current generator 340 having a control terminal coupled to the node 332 to receive the reference voltage $Vcs_{REF}(\theta)$. The third current generator 340 generates a third current $I_{ch3}(\theta)$ having a value based on the value of the reference voltage $Vcs_{REF}(\theta)$. The third current $I_{ch3}(\theta)$ is supplied through one of a pair of complementary switches SW2 to charge a node 342, with this switch being controlled by the FW signal from the ZCD block 322. A resistor $R_{t3}$ is coupled between the node 342 and ground and generates a comparison voltage $V_{CT}(\theta)$ on the node 342 responsive to the third current $I_{ch3}(\theta)$ when the corresponding one of the complementary switches SW2 is closed, which occurs when the FW signal is high indicating current is flowing in the secondary winding $L_s$. The other one of the complementary switches SW2 is coupled between the third current generator 340 and ground and, when the signal $\overline{FW}$ is active high, which occurs when FW is low when no current is flowing through the secondary winding $L_s$, this switch sinks the current $I_{ch3}(\theta)$ from the third current generator to ground.

A transconductance error amplifier 344 has an inverting input coupled to the node 342 which, in turn, is also coupled to a CT pin of the controller 302. A capacitor $C_{t3}$ is coupled to the CT pin and thus to the node 342 and is assumed to be large enough so that an AC component at twice the AC mains line frequency $f_L$ of the comparison voltage $V_{CT}(\theta)$ on the node 342 is negligible with respect to a DC component this voltage, as will be described in more detail below. A non-inverting input of the transconductance error amplifier 344 receives an internal reference voltage $V_{REF}$ and generates an output current based on the differential voltage across the inverting and non-inverting inputs of the amplifier. Thus, the transconductance error amplifier 344 generates an output current having a value based on the difference between the voltage on the node 342 and the reference voltage $V_{REF}$. The output current from the transconductance amplifier 344 charges a compensation capacitor $C_{COMP}$ to thereby generate the compensation signal $V_{COMP}(\theta)$ on the output the transconductance amplifier. The compensation capacitor $C_{COMP}$ is coupled to a COMP pin of the controller 302, with the COMP pin being coupled to the output of the transconductance amplifier 344 as seen in FIG. 3.

In the embodiment of FIG. 3, the controller 302 is formed in an integrated circuit having the pins CT, COMP, GND, GD, and ZCD coupled to the circuitry of the controller as shown, some of which have been discussed in the above description. Within the controller 302, the transconductance error amplifier 344, current generator 340, switches SW2 and resistor $R_{t3}$ may collectively be considered an error detection circuit 346. The capacitors $C_{t3}$ and $C_{COMP}$, although external to the integrated circuit in the embodiment of FIG. 3, may also be considered to be part of the error detection circuit 346. The same is true for the sense resistor Rs, which may be considered part of the driver circuit 312 that was previously described above.

The theory of operation of the controller 302 in controlling the overall operation of the flyback converter 300 will now be described in more detail with reference to FIGS. 3, 4A and 4B. Considering the voltage $V_{COMP}(\theta)$ generated on the output of the transconductance error amplifier 344, the capacitor $C_{COMP}$ is assumed to be large enough so that the AC component at twice the line frequency $f_L$ of the voltage $V_{COMP}(\theta)$ is negligible with respect to the DC component $V_{COMP0}$, at least to a first approximation. The DC component $V_{COMP0}$ of the voltage $V_{COMP}(\theta)$ is defined as:

$$V_{COMP0}=g_{mC}[V_{REF}-V_{CT}(\theta)] \quad \text{(Eqn. 21)}$$

where $g_{mC}$ is the current-to-voltage gain of the transconductance error-amplifier 344, the voltage $V_{REF}$ is the internal voltage reference, and the comparison voltage $V_{CT}(\theta)$ is the voltage developed across the capacitor $C_{t3}$.

The capacitor $C_{t2}$ is charged through the current $I_{ch2}(\theta)$ from the second current generator 336 when the signal FW is high, i.e. during transformer's demagnetization, and the capacitor $C_{t2}$ is discharged through the resistor $R_{t2}$ resistor when the signal Q is high, i.e. during the on-time of the power switch M. A fundamental assumption for the present analysis is that $T(\theta) \ll R_{t2} \times C_{t2} \ll 1/f_L$. In this way, on the one hand the switching frequency ripple across the capacitor $C_{t2}$ is negligible and on the other hand the current $I_{ch2}(\theta)$ can be considered constant within each switching cycle. Using these assumptions, it is possible to find the voltage $V_G(\theta)$ developed across the capacitor $C_{t2}$ by charge balance as follows:

$$I_{ch2}(\theta)T_{FW}(\theta) = \frac{V_G(\theta)}{R_{t2}}T_{ON}(\theta) \quad \text{(Eqn. 22)}$$

The current $I_{ch2}(\theta)$ provided by the current generator 336 can be expressed as:

$$I_{ch2}(\theta)=g_{m2}V_{COMP0} \quad \text{(Eqn. 23)}$$

where $g_{m2}$ is the current-to-voltage gain of the current generator 336. Solving Eqn. (22) for the voltage $V_G(\theta)$, and considering the Eqns. (10) and (23), it can be shown that the voltage $V_G(\theta)$ is given by the following:

$$V_G(\theta)=g_{m2}R_{t2}V_{COMP0}K_V \sin\theta \quad \text{(Eqn. 24)}$$

The resistor $R_{t1}$ is connected in parallel to the capacitor $C_{t1}$ when the signal Q is high, i.e. during the on-time of the power switch M, and is disconnected when the signal Q is low, i.e. during the off-time of the power switch M. The voltage developed across the capacitor $C_{t1}$ is the current sensed reference voltage $V_{CS_{REF}}(\theta)$ and is supplied to the inverting input of the PWM comparator 314. The current generator 330 that generates current $I_{ch1}(\theta)$, capacitor $C_{t1}$, resistor $R_{t1}$ plus the switch SW1 is referred to as the shaper circuit 328 as mentioned above since the circuit changes the shape of the current programming signal.

The current $I_{ch1}(\theta)$ provided by the current generator 330 can be expressed as:

$$I_{ch1}(\theta)=g_{m1}V_G(\theta) \quad \text{(Eqn. 25)}$$

where $g_{m1}$ is the current-to-voltage gain of the current generator 330 that generates the current $I_{ch1}(\theta)$ and the voltage $V_G(\theta)$ is the voltage developed across the capacitor $C_{t2}$.

The same previous assumption is also considered to apply to the shaper circuit 328, namely $T(\theta) \ll R_{t1} \times C_{t1} \ll 1/f_L$. In this way, on the one hand the switching frequency ripple across the capacitor $C_a$ is negligible while on the other hand the current $I_{ch1}(\theta)$ can be considered constant within each switching cycle. Using these assumptions, it is possible to find the voltage $V_{CS_{REF}}(\theta)$ developed across the capacitor $C_{t1}$ by charge balance as follows:

$$I_{ch1}(\theta)T(\theta) = \frac{V_{CS_{REF}}(\theta)}{R_{t1}}T_{ON}(\theta). \quad \text{(Eqn. 26)}$$

Solving for the voltage $V_{CS_{REF}}(\theta)$ in Eqn. (26) and considering Eqns. (24) and (25), it can shown that:

$$V_{CS,REF}(\theta) = g_{m1}R_{t1}g_{m2}R_{t2}V_{COMP0}K_V \sin\theta \frac{T(\theta)}{T_{ON}(\theta)}. \quad \text{(Eqn. 27)}$$

The input current $I_{IN}(\theta)$ of the flyback converter 300 can be found by averaging the primary current $I_p(t,\theta)$ through the primary winding Lp and switch M, where this primary current has a peak value expressed by $$I_{pkp}(\theta) = \frac{V_{CS,REF}(\theta)}{R_S}$$

and, taking into consideration Eqn. (27), the input current may be expressed as:

$$I_{IN}(\theta) = \frac{1}{2}I_{pkp}(\theta)\frac{T_{ON}}{T(\theta)} = V_{COMP0}g m_1 R_{t1} g m_2 R_{t2}\frac{K_V}{2R_S}\sin\theta \qquad \text{(Eqn. 28)}$$

The Eqn. (28) shows that the controller 302 of FIG. 3 implements a control method that achieves a sinusoidal input current $I_{IN}(\theta)$, which as previously discussed means that the converter 300 ideally has a power factor PF=1 and distortion THD=0 in the constant-current primary-controlled Hi-PF QR flyback converter 300 without using the line-sensing circuitry (e.g., the voltage divider formed by the resistors Ra, Rb in FIG. 1).

In the controller 302, the current generator 340 that generates the current $I_{ch3}(\theta)$ that is used to generate the comparison voltage $V_{CT}(\theta)$ signal, and this current can be expressed as:

$$I_{ch3}(\theta) = G_M V_{CS,REF}(\theta) \qquad \text{(Eqn. 29)}$$

where $G_M$ is the current-to-voltage gain of the current generator 340. Now considering the capacitor $C_{t3}$ by charge balance, it is possible to find the comparison voltage $V_{CT}(\theta)$ developed across the capacitor $C_{t3}$ as follows:

$$I_{ch3}(\theta)T_{FW}(\theta) = \frac{V_{CT}(\theta)}{R_{t3}}T(\theta) \qquad \text{(Eqn. 30)}$$

Solving Eqn. (30) for the comparison voltage $V_{CT}(\theta)$ and then considering Eqn. (27), it can be shown that:

$$V_{CT}(\theta) = G_M R_{t3} g m_1 R_{t1} g m_2 R_{t2} K_V V_{COMP0}\sin\theta\frac{T_{FW}(\theta)}{T_{ON}(\theta)} \qquad \text{(Eqn. 31)}$$

Similar to the prior approach of FIG. 1, the capacitor $C_{t3}$ is assumed to be large enough so that the AC component at twice the AC mains input line frequency $f_L$ of the comparison voltage $V_{CT}(\theta)$ is negligible with respect to its DC component $V_{CT0}$, at least to a first approximation. The DC component $V_{CT0}$ is then given by:

$$V_{CT0} = \qquad \text{(Eqn. 32)}$$
$$\overline{V_{CT}(\theta)} = \frac{1}{\pi}G_M T_{t3} g m_1 R_{t1} g m_2 R_{t2} V_{COMP0} K_V \int_0^\pi \sin\theta\frac{T_{FW}(\theta)}{T_{ON}(\theta)}d\theta$$

Now considering the voltage-second balance for the transformer 308 of the flyback converter as expressed in Eqn. (10), the DC component $V_{CT0}$ can be shown to be given by:

$$V_{CT0} = \frac{1}{\pi}G_M R_{t3} g m_1 R_{t1} g m_2 R_{t2} V_{COMP0} K_V^2 \int_0^\pi \sin\theta^2 d\theta = \qquad \text{(Eqn. 33)}$$
$$\frac{G_M R_{t3} g m_1 R_{t1} g m_2 R_{t2}}{2}K_V^2 V_{COMP0}$$

Assuming the low-frequency "loop gain">>1, then the DC component $V_{CT0}$ is equal to the internal reference $V_{REF}$:

$$V_{CT0} = V_{REF} \qquad \text{(Eqn. 34)}$$

Combining Eqn. (34) with Eqns. (33) and (27), the current reference voltage is shown to be:

$$V_{CS,REF}(\theta) = \frac{2}{G_M R_{t3}}\frac{V_{REF}}{K_V}\sin\theta\frac{T(\theta)}{T_{ON}(\theta)} \qquad \text{(Eqn. 35)}$$

If the same mathematical operations are performed for Eqn. (14), the peak secondary current $I_{pks}(\theta)$ of the flyback converter 300 can be calculated starting from Eqn. (35) as follows:

$$I_{pks}(\theta) = n\frac{2}{G_M R_{t3}}\frac{V_{REF}}{K_V}\sin\theta\frac{T(\theta)}{T_{ON}(\theta)}\frac{1}{R_S} \qquad \text{(Eqn. 36)}$$

Since the cycle-by-cycle secondary current $I_s(t,\theta)$ is the series of triangles shown in FIG. 4A for this signal, the average value of this secondary current in a switching cycle is given by:

$$I_o(\theta) = n\frac{nV_{REF}}{G_M R_{t3}K_V}\sin\theta\frac{T_{FW}(\theta)}{T_{ON}(\theta)}\frac{1}{R_S} \qquad \text{(Eqn. 37)}$$

The DC output current $I_{out}$ of the flyback converter 300 is the average of the current $I_o(\theta)$ over a main line half-cycle and is given by:

$$I_{out} = \overline{I_o(\theta)} = \frac{1}{\pi}\int_0^\pi \frac{nV_{REF}}{G_M R_{t3}K_V R_S}\sin\theta\frac{T_{FW}(\theta)}{T_{ON}(\theta)}d\theta \qquad \text{(Eqn. 38)}$$

Finally, combining Eqns. (38) and (10) the average output current of the flyback converter is shown to be:

$$I_{out} = \frac{V_{REF}}{G_M R_{t3}}\frac{n}{2R_S} \qquad \text{(Eqn. 39)}$$

The Eqn. (39) shows the control method implemented by the controller 302 of FIG. 3, the DC output current $I_{out}$ depends only on external, user-selectable parameters, namely the turns ratio n of the transformer 308 and the sense resistor Rs, and on internally fixed parameters ($G_M$, $R_{t3}$, $V_{REF}$) and does not depend on the output voltage $V_{out}$, or on the RMS of the input voltage $V_{in}(\theta)$, or on the switching frequency $f_{SW}(\theta)=1/T(\theta)$. As a result, the control method implemented by controller 302, in addition to providing ideally unity power factor PF=1 and zero harmonic distortion (THD=0) of the input current $I_{IN}(\theta)$, also controls the flyback converter 300 to provide a regulated output current $I_{out}$ using only quantities available on the primary side of the converter, and without using an analog divider and line-sensing circuitry as were utilized in the converter 100 of FIG. 1.

Figure 5:
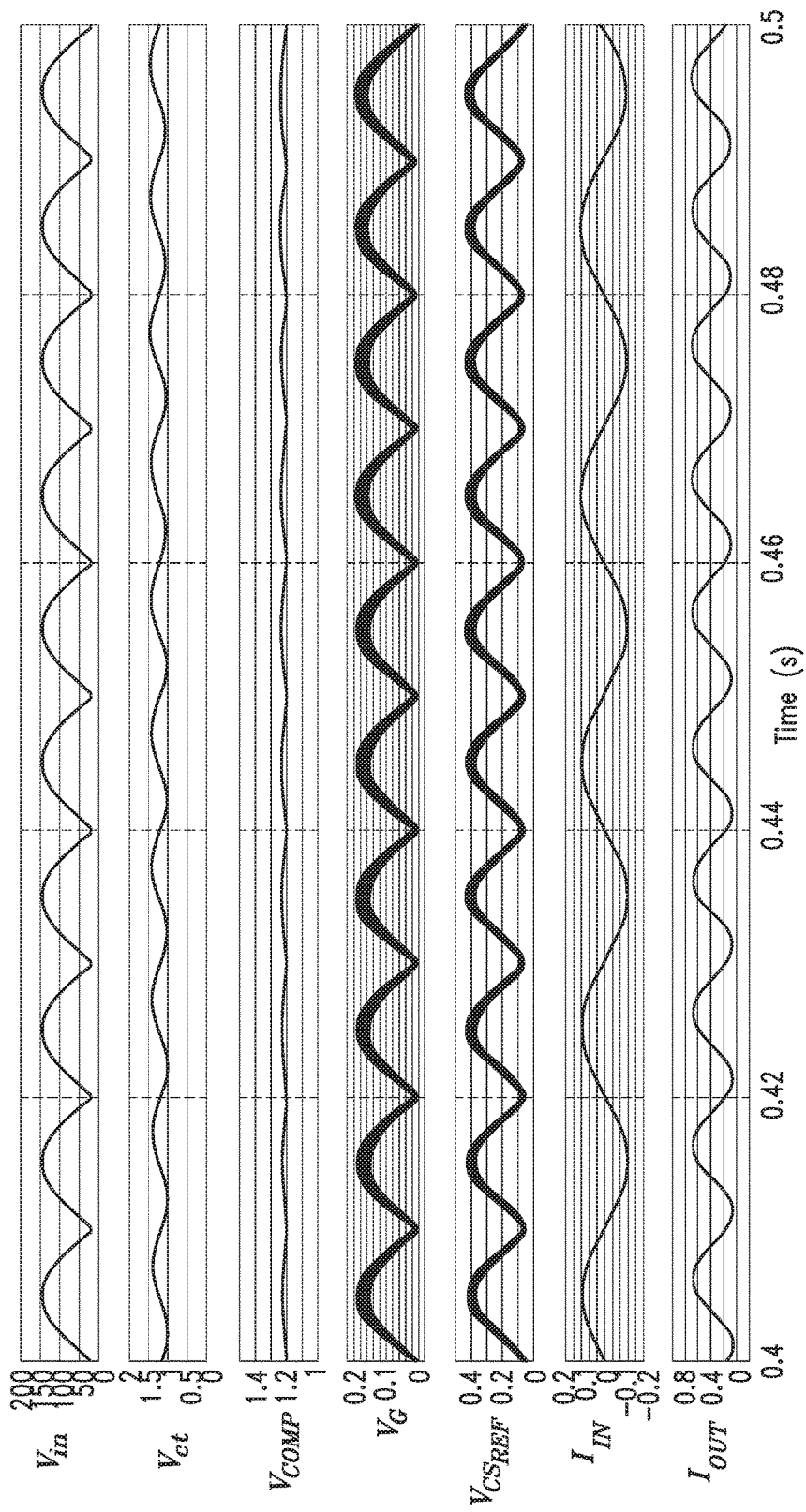
FIG. 5 is a timing diagram showing simulation results for the flyback converter of FIG. 3 for an input voltage Vac=115 Vac.
Figure 6:
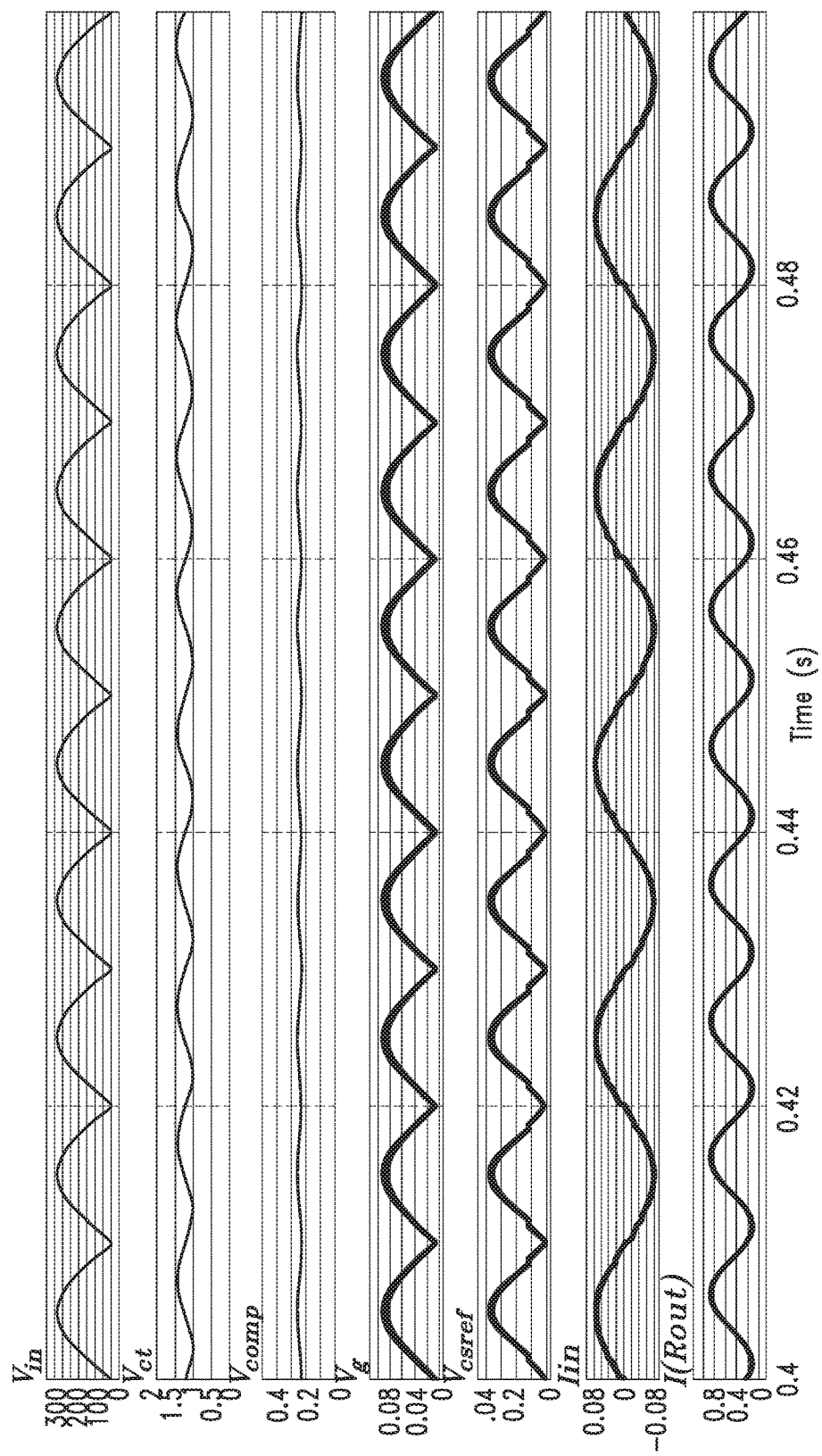
FIG. 6 is a timing diagram showing simulation results for the flyback converter of FIG. 3 for an input voltage Vac=230 Vac.
Figures 7A, 7B:
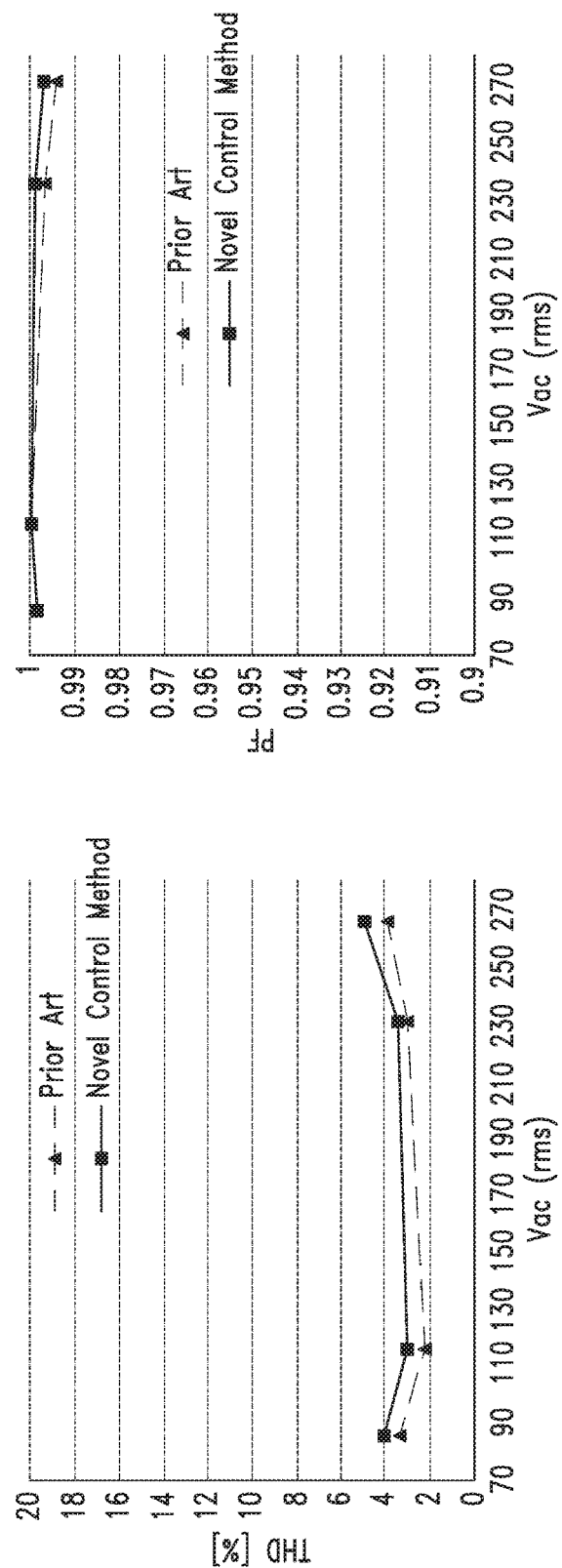
FIGS. 7A and 7B are graphs showing simulation results comparing the total harmonic distortion (THD) of the flyback converters of FIGS. 1 and 3 in FIG. 7A and comparing the power factor PF of the two converters FIG. 7B.
Figure 8:
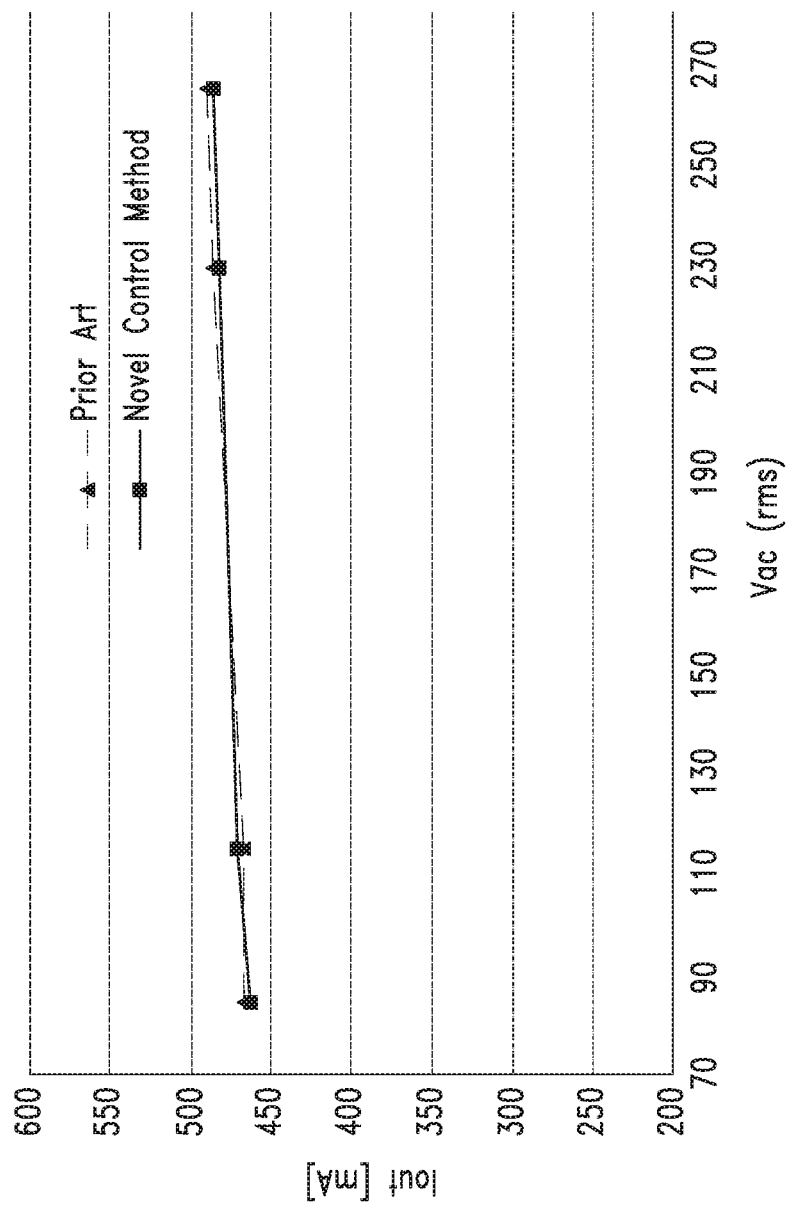
FIG. 8 is a graph showing simulation results comparing regulation of the average output current provided by the flyback converters of FIGS. 1 and 3.

The control method implemented by the controller 302 of FIG. 3 has been tested and validated with PSIM simulations, where PSIM is an electronic circuit simulation software package that is specifically designed specifically for use in simulating power electronics circuits. The timing diagrams resulting from some of these simulations are shown in FIGS. 5 and 6. FIG. 5 shows a simulation where the input voltage $V_{ac}(\theta)$ is 115 VAC while FIG. 6 shows a simulation where the input voltage is 230 VAC. As seen in these simulations, there is a very low level of distortion of the input current (around 2.8% at $V_{in}$=115 Vac, around 3.2% at $V_{in}$=230 Vac) due to an input EMI filter and the non-idealities considered both in the power circuit and the control circuit of the converter 300. FIGS. 7A and 7B are graphs showing simulation results for the converter 300 in comparison to the converter 100, with FIG. 7A showing a comparison of the THD levels of the two converters and FIG. 7B showing a comparison of the power factor PF of the two converters. FIG. 8 is a graph showing simulation results comparing regulation of the average output current $I_{out}$ of the flyback converters 300 and 100 and illustrates that the converter 300 provides regulation that is just as good as the converter 100 but without requiring the line-sensing and analog divider circuitry to do so, as discussed above.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited to the embodiments described in the present disclosure.

The invention claimed is:

1. A method of controlling a power switch, comprising:
generating a current sensed signal based on a primary current through a primary winding of a transformer coupled to the power switch;
deactivating the power switch based on the current sensed signal reaching a current sensed reference;
transferring energy stored in the primary winding of the transformer to a secondary winding of the transformer during a demagnetization mode of operation that starts in response to deactivating the power switch;
charging a first capacitance with a first charging current during the demagnetization mode to generate the current sensed reference, the first charging current having a value based on a bias signal;
charging a second capacitance with a second charging current during the demagnetization mode to generate the bias signal, the second charging current having a value based on a compensation signal;
generating a third charging current during the demagnetization mode to generate a comparison signal, the third charging current having a value based on the current sensed reference;
generating the compensation signal based on a difference between the comparison signal and an internal reference; and
activating the power switch in response to a secondary current in the secondary winding of the transformer becoming equal to zero.

2. The method of claim 1, wherein activating the power switch in response to a secondary current in the secondary winding of the transformer becoming equal to zero comprises activating the power switch a delay time after the secondary current becomes equal to zero.

3. The method of claim 1, wherein generating the compensation signal comprises generating an output current based on the difference between the comparison signal and the internal reference and charging a compensation capacitance with the output current to generate a voltage on the compensation capacitance that corresponds to the compensation signal.

4. The method of claim 1 further comprising discharging the first and second capacitances in response to activating the power switch.

5. The method of claim 1, wherein generating the third charging current during the demagnetization mode to generate the comparison signal comprises supplying the third charging current to a resistive circuit to generate a voltage on the resistive circuit that corresponds to the comparison signal.

6. The method of claim 5 further comprising discharging a compensation capacitance coupled to the resistive circuit in response to the secondary current in the secondary winding of the transformer becoming equal to zero.

7. The method of claim 1, wherein each of the current sensed signal, current sensed reference, bias signal, compensation signal, and comparison signal is a voltage signal.

8. The method of claim 1 further comprising generating an output voltage based on the secondary current in the secondary winding during the demagnetization mode of operation.

9. The method of claim 1 further comprising detecting the secondary current in the second winding through an auxiliary winding that is magnetically coupled to the secondary winding.

10. The method of claim 1, wherein deactivating and activating the power switch comprise:
generating a drive signal;
deactivating the drive signal based comparing the current sensed signal to the current sensed reference; and
activating the drive signal in response to detecting the secondary current is approximately equal to zero.

11. The method of claim 1, wherein generating the current sensed signal comprises generating a voltage across a sense resistor in response to the primary current through the primary winding.

12. A method, comprising:
generating a current sensed signal based on a primary current through a primary winding of a transformer coupled to the power switch;
deactivating the power switch based on the current sensed signal reaching a current sensed reference;
transferring energy stored in the primary winding of the transformer to a secondary winding of the transformer during a demagnetization mode of operation that starts in response to deactivating the power switch;
charging a first capacitance with a first charging current during the demagnetization mode to generate the current sensed reference, the first charging current having a value based on a bias signal;
charging a second capacitance with a second charging current during the demagnetization mode to generate the bias signal, the second charging current having a value based on a compensation signal;
generating a third charging current during the demagnetization mode to generate a comparison signal, the third charging current having a value based on the current sensed reference;
generating the compensation signal based on a difference between the comparison signal and an internal reference;
activating the power switch in response to a secondary current in the secondary winding of the transformer becoming equal to zero;

charging an output capacitance in response to the secondary current in the secondary winding during the demagnetization mode; and providing power from the secondary current and the output capacitance to drive a load.

13. The method of claim 12, wherein the load comprises a set of series-connected light-emitting diodes.

14. The method of claim 12 further comprising generating a pulse width modulated drive signal to control activation and deactivation of the power switch, the drive signal being based on based a comparison of the current sensed signal to the current sensed reference and on a value of the secondary current in the secondary winding.

15. The method of claim 12, wherein generating the pulse width modulated drive signal comprises setting an RS latch to activate the drive signal to turn on the power switch in response to the value of the secondary current in the secondary winding becoming approximately zero and resetting the RS latch to deactivate the drive signal to turn off the power switch based on the comparison of the current sensed signal and the current sensed reference.

16. The method of claim 12 further comprising rectifying an alternating input voltage and providing the rectified alternating voltage to the primary winding of the transformer.

17. The method of claim 16, wherein the alternating input voltage is an AC mains input voltage having a value of one of 115 Vac and 230 Vac.

18. A method of controlling a power switch, comprising:
sensing a primary current through a primary winding of a transformer coupled to the power switch;
deactivating the power switch in response to the sensed primary current reaching a current sensed reference;
initiating a demagnetization mode of operation in response to deactivating the power switch;
during the demagnetization mode of operation,
charging a first capacitance with a first charging current to generate the current sensed reference, the first charging current having a value based on a bias signal;
charging a second capacitance with a second charging current to generate the bias signal, the second charging current having a value based on a compensation signal;
generating a third charging current to generate a comparison signal, the third charging current having a value based on the current sensed reference;
generating the compensation signal based on a difference between the comparison signal and an internal reference; and
activating the power switch in response to a secondary current in the secondary winding of the transformer becoming approximately equal to zero.

19. The method of claim 18, wherein during the demagnetization mode of operation energy stored in the primary winding of the transformer is transferred to the secondary winding of the transformer.

20. The method of claim 18, wherein activating and deactivating the power switch includes setting and resetting an RS latch, respectively.

* * * * *